Figure 1:
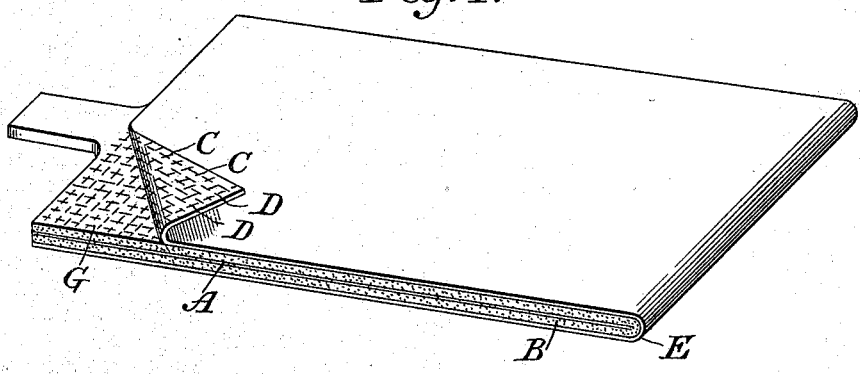

No. 723,326. PATENTED MAR. 24, 1903.
E. A. SPERRY.
ARMORED ELEMENT FOR ELECTRIC BATTERIES.
APPLICATION FILED MAY 25, 1901.

NO MODEL.

Attest:
A. N. Jesbera.
J. M. Scoble.

Inventor:
Elmer A. Sperry
by Redding, Kiddle & Greeley
Attys.

UNITED STATES PATENT OFFICE.

ELMER A. SPERRY, OF CLEVELAND, OHIO, ASSIGNOR TO NATIONAL BATTERY COMPANY, OF CLEVELAND, OHIO, AND JERSEY CITY, NEW JERSEY, A CORPORATION OF NEW JERSEY.

ARMORED ELEMENT FOR ELECTRIC BATTERIES.

SPECIFICATION forming part of Letters Patent No. 723,326, dated March 24, 1903.

Application filed May 25, 1901. Serial No. 61,848. (No model.)

*To all whom it may concern:*

Be it known that I, ELMER A. SPERRY, a citizen of the United States, residing at Cleveland, county of Cuyahoga, State of Ohio, have invented certain new and useful Improvements in Armored Elements for Electric Batteries, of which the following is a specification, reference being had to the accompanying drawings, forming a part hereof.

This invention relates especially to electrodes for storage batteries.

Great difficulty has heretofore been experienced in keeping the envelop or shield close to the surface of electrodes to prevent the disintegration and dislodgment of the active material. The escaping gases are found to pry the envelop away. Fine particles of active material soon become separated from the mass or body of such material and fill the pocket thus formed and the excretion goes on and enlarges until the "blister" spans the space across to the opposite electrode and short circuit follows.

It is the object of the present invention to overcome the undesirable action just referred to without in any way sacrificing any desirable qualities.

In accordance with the invention the disintegration, abrasion, peeling, and consequent shedding of the active material are arrested by providing a tough armor of inert fabric entirely covering the face of the electrode, preferably in an unbroken web, such fabric being made integral with the electrode by being embedded into the active material, preferably when the same is in a plastic state and located at or near but substantially within the surface, and thereby constituting of the same a coherent and integral mass. An electrode thus constructed is found to be provided with armor which will resist the washing and abrasive action of the constantly moving and agitated electrolyte, and at the same time the armor when made of fabric is so porous that the gases have free passage and together with the ions are unimpeded and traverse the cuticle-like sheath freely and without increasing the impedance or inner resistance of the battery, of which the electrodes form a part. The armor also serves valuable purposes as a binder, as it is found to securely hold any loose pieces from falling out of place should a portion become cracked or loosened through mechanical injury. Short circuits may thus be almost entirely prevented.

The desired objects are attained by a structure illustrated in the accompanying drawings, showing one form or method of carrying the invention into effect.

Figure 2:
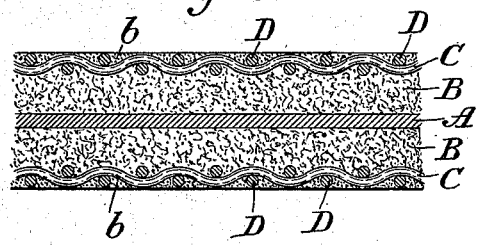

In said drawings, Figure 1 is a perspective view of a battery-electrode embodying my invention, a portion of the combined active material and the embedded fabric being turned up at one corner of the electrode. Fig. 2 is an enlarged view of a cross-section of a portion of such electrode.

In the structure represented in the drawings the usual metal plate or grid is represented at A, and the active material carried thereby at B. The inert fabric which is incorporated with the active material at or near but substantially within the surface of such active material is represented at C D and may consist of threads C and threads D interwoven or of fibers not so interwoven, but loosely interlaced or felted, or of a more closely woven or felted fabric perforated at intervals. The fabric is preferably made of nitrocellulose or pyroxylin, suitably prepared so as to retain as far as possible the strength of the original fibers, it having been found that such material does not depreciate or lose its strength in the battery solution under the electric action.

The active material B, which is preferably employed in the formation of the armored plate, is a material which at some stage in its operation is plastic or a material which by the action of a suitable solvent can be made plastic, so that the fabric when applied by pressure or otherwise to the plastic or semiplastic material may be thoroughly incorporated with the material, such material penetrating through the interstices of the fabric and practically covering both sides thereof. In this manner the true surface of the electrode will really be a surface of active material which is practically integral with the main body of active material between the fabric and the plate or grid. In practice it will be found that some of the fibers or threads of the fabric may actually reach the surface, but they will not be sufficient in number to have any appreciable effect upon the electrode. It will be understood that the material B is preferably of such character as to become hard after the application of the fabric thereto. The active material and the fabric may with advantage be wrapped around one edge of the plate A, preferably the bottom edge, as shown at E in Fig. 1. In this figure is also illustrated the thorough incorporation of the fabric in a body of active material, the rough surface G being produced when the fabric and the surface portion $b$ of the active material are forcibly torn away from the main body of active material.

It has been found in practice that the active material of armored plates formed as described herein is not dislodged when pried from the plate or grid by the action of the escaping gases.

It will be understood that various modifications may be made in the structure of the improved electrode without departing from the spirit of the invention, and particularly that the invention is not limited to the precise character of the fabric represented in the drawings nor to the particular material of which such fabric is described herein as formed.

I claim as my invention—

1. An armored battery element comprising a plate or grid, active material, and a fabric which is attached to and incorporated with said active material, said active material extending through the interstices of said fabric and forming substantially the surface of the electrode.

2. An armored battery element comprising a plate or grid, active material and a sheet of open-meshed, inert fabric, incorporated with the active material at the surface thereof, such material being forced through the interstices of the fabric and expanded on the outside.

3. An armored battery-electrode comprising a plate or grid, active material and an open-meshed, inert fabric, folded around the edge of the plate, and incorporated with the active material at the surface thereof, such material being forced through the meshes and expanded on the outside.

4. In a battery element, the combination of a plate or grid, an open-meshed, inert fabric and an active material composed of ingredients which have the capacity of setting or becoming hard, the said fabric being incorporated with and covered by the material at the surface thereof.

5. In a battery element, the combination of a plate or grid, an open-meshed, inert fabric and an active material composed of ingredients which have the capacity of setting or becoming hard, the said fabric being embedded into the material at the surface thereof in such manner that the material extends through the meshes and is spread out upon the outer surface and secures the fabric in position.

6. A battery element comprising the combination of a plate or grid, active material placed thereon and crossed or woven fibers of suitable inert material embedded in the active material at the surface thereof to bind the same together, substantially as and for the purpose set forth.

7. An armored battery element comprising a plate or grid, active material and a fabric of pyroxylin attached to and incorporated with the active material at the surface thereof, such material being forced through the interstices of the fabric and made to surround the fibers thereof.

This specification signed and witnessed this 21st day of May, A. D. 1901.

ELMER A. SPERRY.

In presence of—
H. C. STEVENS,
K. E. GRIFFIN.